United States Patent Office 3,234,197
Patented Feb. 8, 1966

3,234,197
MODIFIED OLEFIN POLYMER EXHIBITING ADHESIVE CHARACTERISTICS PREPARED BY CROSS-LINKING AN OXIDIZED POLYMER WITH AN ORGANIC PEROXIDE AND HEAT
Bernard O. Baum, Union County, N.J., assignor to Union Carbide Corporation, a corporation of New York
No Drawing. Filed Mar. 27, 1962, Ser. No. 182,940
2 Claims. (Cl. 260—93.7)

This invention relates to modified olefin polymers exhibiting improved adhesion to a wide variety of substrates. More particularly, the invention relates to a method for modifying olefin polymers to exhibit the above characteristic and to olefin polymers so modified.

The term "olefin polymers" is used in the present specification and claims to denote normally solid homopolymers of alpha mono-olefinically unsaturated hydrocarbons as well as normally solid copolymers thereof, with one or more other organic compounds copolymerizable therewith which contain polymer producing unsaturation, such as is present for example in carbon monoxide and formaldehyde and in compounds containing the ethylene linkage C=C e.g. styrene, vinyl stearate, butene, vinyl acetate, vinyl formate, methacrylate, monobutyl maleate, 2-ethyl hexyl acrylate, N-methyl-N-vinyl acetamide, methacrylic acid, ethyl acrylate, arcylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred olefin polymers in this invention contain at least 10 percent by weight of a combined alpha mono-olefinically unsaturated hydrocarbon having from 2 to 4 carbon atoms inclusive, i.e. butene-1, propylene and especially ethylene.

As packaging materials, olefin polymer films are characteristically superior to cellulosic and metallic materials in flexibility, resistance to tear and in being unaffected by moisture and chemically active environments. Cellulosic and metallic packaging materials, however, are generally superior to olefin polymer films in shock-absorbing properties and are more easily handled in automatic packaging machinery. A combination of the properties of these packaging materials is possible by laminating or coating the olefin polymer on the cellulosic or metallic material. The general inertness of the olefin polymers to solvents and adhesives, however, has thus far substantially prevented obtaining of suitable laminated and coated substrates except by costly pretreatment of the olefin polymer surface, e.g. etching with chromic acid, subjecting to corona discharge and flame treatment.

It is an object, therefore, of the present invention to provide olefin polymers which exhibit good adhesion to both porous and nonporous substrates without the need of surface treatment of the polymer after shaping which are adapted to use in coating and in laminate constructions.

It is another object to provide a method for modifying olefin polymers to impart improved adhesional characteristics.

It has now been discovered that surprising and marked adhesional properties are imparted to olefin polymers having a peroxide content (measured as described below) of from 0.15 to 3.5 milligrams (mg.) peroxide per gram resin and/or an infra-red carbonyl content (also measured as described below) of from 0.0005 to 0.03 carbonyl absorbance per mil resin by reacting the olefin polymer with an organic peroxide.

A highly surprising and unexpected property of the organic peroxide reacted oxidized olefin polymers of this invention is their marked adhesional properties. These modified olefin polymers applied as liquids for coating or as film for surfacing various substrates or as laminate interlayers exhibit tenacious adhesion to fibrous, nonfibrous, porous, and non-porous, flexible and rigid, metallic and nonmetallic, polymeric, cellulosic and glass surfaces.

In general, the method of this invention requires for imparting adhesional characteristics to olefin polymers mixing to substantial homogenity an oxidized olefin polymer and an organic peroxide and modifying the olefin polymer by reacting peroxide with the olefin polymer. It is essential in the method of this invention to employ an olefin polymer having the above peroxide and carbonyl characteristics. These peroxide and carbonyl values cannot be obtained without deliberate oxidation.

The particular means of achieving oxidation of the olefin polymer is not narrowly critical. Broadly, intimately contacting the olefin polymer with an oxygen containing environment such as air, oxygen, ozone, various catalytic agents, or chemical reagents for a sufficient length of time will result in the oxidation production of certain isocyanate reactive groups. Among these groups are carboxyl, hydroxyl, hydroperoxide and hydrogen groups. Levels of peroxide and/or carbonyl within the above limits are indicative of the presence of suitable amounts of these oxidation produced groups.

A suitable means of producing these groups in olefin polymers is to bubble ozone, or oxygen or a mixture thereof, e.g. 2% ozone in oxygen, through a heated bed e.g. to 60° C. of powdered, e.g. 20 mesh, virgin olefin polymer for a sufficient time, e.g. for 60 minutes.

This treatment of a virgin ethylene homopolymer which normally has a carbonyl absorbance per mil of 0.0002 and a peroxide content of 0.04 milligram per gram resin results in an oxidized ethylene polymer increased in carbonyl absorbance to 0.003 per mil resin and peroxide content to 1.4 milligrams per gram resin. Also suitable is treating the virgin olefin polymer with an oxidizing chemical reagent e.g., by slurrying powdered resin in heated chromic acid (sulfuric acid-potassium dichromate) for about 30 minutes. The resin should be washed with water afterwards to remove acid and dichromate. This treatment of virgin ethylene homopolymer causes an increase in carbonyl absorbance per mil to 0.005 and in peroxide content to 1.5 milligrams per gram resin.

Still another suitable method of controllably oxidizing ethylene polymers is milling the polymer in air or oxygen containing atmosphere at elevated temperatures, e.g., above 110° C. for a sufficient period e.g. 45 minutes. This treatment of ethylene homopolymer causes an increase in carbonyl absorbance to 0.007 per mil and in peroxide content to 1.9 milligrams peroxide per gram resin. Other oxidizing means include agitation in suitably atmospherically controlled apparatus other than roll mills. Oxidation can also be effected by sparging oxygen, air or ozone into a solution of the ethylene polymer.

From the foregoing illustrative means for oxidizing the olefin polymers, it can be seen that in any method wherein heat and oxygen are mutually present with an olefin polymer under conditions insuring a good degree of contact between the polymer and the oxygen, oxidation will take place. It is of course also required that the contacting be carried out for a time sufficient to build up carbonyl absorbance and peroxide content levels to the above set forth minimal values.

Olefin polymers which have not been subjected to deliberate oxidation by mechanical working, solvating or chemical reaction in an oxidizing atmosphere are herein termed "virgin olefin polymers." Reaction of virgin olefin polymers which have less than the above oxidation levels with organic peroxides does not provide to a significant extent the foregoing remarkable adhesional properties. In the absence of deliberate oxidation the oxidation levels of olefin polymers are substantially as shown in Table I in which all percentages are by weight and in which the carbonyl absorbance and peroxide content were determined as hereinafter set forth.

Table I

| Olefin Polymer | Carbonyl Absorbance per mil [1] | Peroxide Content, mg./gm. resin |
|---|---|---|
| Ethylene homopolymer: | | |
| (0.92 density) | 0.0002 | 0.04 |
| (0.945 density) | 0.0002 | 0.02 |
| Ethylene/carbon monoxide (94%/6%) | | 0.06 |
| Ethylene/propylene (48%/52%) | | 0.035 |
| Ethylene/propylene (89%/11%) | | 0.045 |
| Ethylene/ethyl acrylate (79%/21%) | | 0.024 |
| Ethylene/ethyl acrylate (94%/6%) | | 0.05 |
| Ethylene/vinyl acetate (5.6 mole percent vinyl acetate in feed) | | 0.05 |
| Propylene | 0.0002 | 0.04 |

[1] Because olefin polymers may contain bands in the infra red which interfere with the carbony band, 5.8–5.85, meaningful infra red data must be in comparison with another sample of the resin e.g. oxidized vs. virgin (differential carbonyl absorbance). Hence carbonyl values in this table are given only for ethylene homopolymers which are devoid of carbonyl or other interfering bands and hence give absolute carbonyl absorbance values.

Preferred means for oxidizing the olefin polymers are mechanical mixing apparatus open to the air such as two roll mills and closed intermeshing gear type apparatus provided with oxygen or air atmosphere. The apparatus especially when heated to between 110° C. to 170° C., depending upon the oxidation susceptibility of the polymer easily bring olefin polymers above (1) the minimum peroxide content of 0.15 milligram peroxide per gram resin and into the preferred peroxide content range of from 0.60 to 2.7 milligrams peroxide per gram resin; and (2) above the minimum differential carbonyl absorbance of 0.0005 per mil resin to within preferred range of 0.001 and above carbonyl absorbance per mil resin. Differential carbonyl absorbance per mil in the case of ethylene homopolymer is equal to the absolute carbonyl absorbance due to the absence of interfering bands in that polymer; with certain ethylene copolymers, however, the differential carbonyl absorbance represents only the relative amounts of carbonyl before and after the oxidation described above.

An advantage of mechanical mixing apparatus is that the organic peroxide reactant can be blended in during oxidation of the olefin polymer or just subsequently thereto without the need of further handling of the oxidized polymer. For example, an ethylene polymer can be oxidized by milling 45 minutes at 170° C. in air and the organic peroxide blended in by fluxing the polymer at 110° C., adding the organic peroxide and milling for about 5 minutes or until the additive is uniformly dispersed. In addition to the organic peroxides, there can be incorporated at this point conventional additives, e.g. fillers such as carbon blacks and clays, pigments, catalysts for the peroxide reaction, and the like. Other means for incorporating the various additives and crosslinking agents can be employed. The latter can be added during or after oxidation of olefin polymer.

Organic peroxides useful in the present invention are, generally, compounds composed of carbon, hydrogen and oxygen, and have the general formula $R^1OOR^2$ wherein $R^1$ is an organic radical and $R^2$ is an organic radical or hydrogen. $R^1$ and $R^2$ can be hydrocarbon radicals or organic radicals substituted with a great variety of substituents.

Preferred classes include alkyl peroxides e.g. t-butyl peroxide, alkyl esters of organic peracids e.g. t-butyl perbenzoate, and aryl substituted alkyl peroxides e.g. dicumyl peroxide. Specific compounds illustrative of these and other classes of organic peroxides are:

Cumene hydroperoxide
Di-tert-butyl peroxide
Dimethyl peroxide
Tetralyl hydroperoxide
n-Octyl hydroperoxide
Diethyl peroxide
t-Butyl hydroperoxide
t-Butyl perbenzoate
t-Butyl peracetate
Peracetic acid
Dibenzoyl peroxide
Bis(p-chlorobenzoyl)peroxide
Cyclohexanone peroxide
Diacetyl peroxide
Hydroxyheptyl peroxide
Dibutyryl peroxide
Dipropionyl peroxide
Dioctanoyl peroxide
Dilauroyl peroxide
Diisopropyl peroxydicarbonate
Bis(heptafluorobutyryl)peroxide
Bis(2,4-dichlorobenzoyl)peroxide
p-Menthane hydroperoxide
Pinene hydroperoxide
Dicumyl peroxide
Di-t-butyl diperphthalate
t-Butyl peroxyisobutyrate
Methyl ethyl ketone peroxide
2,5-dimethylhexane-2,5-dihydroperoxide and other organic peroxides such as are well known to those in the art.

By the term "organic peroxide," mixtures of two or more organic peroxides are meant to be included.

The use of organic peroxides in oxidized olefin polymers in quite minor amounts is productive of improved adhesion and a generally favorable modification of polymer properties. The amount of organic peroxide generally will not exceed about 5 percent by weight based on the oxidized olefin polymer as adhesion is not significantly improved with greater amounts. Use of less than about 0.10 percent by weight organic peroxide based on the olefin polymer confers only negligible improvement in adhesionability of the olefin polymers. About 0.25 percent by weight and particularly above about 0.5 percent by weight up to about 3.0 percent by weight of organic peroxide based on the olefin polymer imparts significant adhesionability improvement. The improvement in olefin polymer adhesionability from about 0.5 to about 3 percent by weight of organic peroxide based on the oxidized olefin polymer is not proportionately increased by further increasing the organic peroxide concentration to between 3 and 5 percent by weight. Hence, concentrations of organic peroxide between 0.5 and 3.0 percent by weight are preferred.

The practice of the present invention is illustrated by the following examples wherein all parts and percentages are by weight unless otherwise specified.

Carbonyl absorbance per mil was determined by infrared techniques using a 20 mil plaque. Measurements were made at 5.84 microns and absorbance per mil calculated according to the equation:

$$\text{Absorbance/mil} = \frac{\log \frac{I_0}{I}}{t}$$

where $t$ = thickness in mils
$I_0$ = incident radiation, percent transmission
$I$ = transmitted radiation, percent transmission Apparatus used was a Perkin-Elmer Model 21 double beam infra-red spectrophotometer.

The carbonyl absorbance per mil of all olefin polymers except ethylene homopolymers was measured as differential absorbance by placing an equally thick sample of virgin resin into the reference beam while the oxidized polymer sample was in the sample beam. Thus, the carbonyl measured was that formed by the oxidation step.

Peroxide content was determined by weighing 0.500±0.001 gram of finely divided polyethylene (powdered to 20 mesh) into an 8 by 1 inch pressure tube; pipetting 25 ml. of alcohol-stabilized tetrachloroethylene into a 50 ml. graduate and adding 7 ml. of a one percent solution of sodium iodide in methanol. This was mixed and added to the resin in the pressure tube which was then capped. Heat at 130° C. was applied for five minutes. The tubes were removed and cooled in Dry Ice for three minutes. Five milliliters of the methanol-iodine layer was pipetted off. The transmission was measured in a Beckman DU spectrophotometer at 450 and 600 m$\mu$ using the methanol-iodide solution as a blank.

The sodium iodide in methanol was made up as follows: 1.00 grams of sodium iodide was dissolved in 100 grams (125 cc.) of distilled methanol which had been made acid by addition of a drop of phosphoric acid.

Peroxide content was then calculated from the formula:

$$\frac{A}{B} \times 100 = \text{corrected percent transmission at 450 m}\mu$$

$A$ = percent transmission at 450 m$\mu$
$B$ = percent transmission at 600 m$\mu$

Table II

VARIATION OF LIGHT TRANSMISSION WITH PEROXIDE CONTENT IN POLYETHYLENE

| Milligrams peroxidic oxygen/gram resin: | Log of percent light transmission (450 m$\mu$, 10 mm. light path) |
|---|---|
| 0.05 | 67 |
| 0.1 | 44.5 |
| 0.15 | 29.5 |
| 0.2 | 19.5 |
| 0.25 | 15.0 |

Using the corrected transmission from the above table for the milligrams of peroxidic oxygen per gram resin, the peroxide content is calculated from the equation:

$$\frac{M}{S} = \text{peroxidic oxygen, mg. per gm. resin}$$

$M$ = mg. peroxidic oxygen from chart
$S$ = sample weight

EXAMPLE 1.—IMPROVEMENT IN ADHESION PROPERTIES OF OXIDIZED ETHYLENE POLYMER BY REACTING WITH ORGANIC PEROXIDE

Ethylene polymer was oxidized, and mixed with an amount of dicumyl peroxide or t-butyl perbenzoate. The ethylene polymer was oxidized by milling in air for 45 minutes at 170° C. The oxidized ethylene polymer was milled on a two-roll mill at 110° C. and, immediately after fluxing an amount of dicumyl peroxide or t-butyl perbenzoate was incorporated into the ethylene polymer. The modified polymer was sheeted, ground, and compression molded into 20 mil plaques. The 20 mil plaque was placed between a 20 mil thick sheet of polyethylene and a solvent washed, cold rolled steel panel. The assembly was placed between cellophane wrapped polished platens and cured under 100-200 pounds/sq. in. at 170° C. for 10 minutes pressure in a standard hydraulic steam heated press.

The peel adhesion of the polyethylene film sheet to the substrate was measured according to ASTM D-903 on a Scott tensile tester in the following manner:

A one inch wide strip was cut across the polyethylene and down to the substrate. The strip was then peeled from the substrate at a constant rate of one inch/minute and the force required measured in pounds/inch.

Experimental data and results are given in Table III below.

Table III

OXIDIZED ETHYLENE POLYMER WITH ORGANIC PEROXIDES

| | | | Peel Strength (lbs./in.) Polyethylene [1] | |
|---|---|---|---|---|
| | | | Virgin | Oxidized |
| Peroxide mg./gm | | | 0.03 | 1.9 |
| Carbonyl Absorbance/mil | | | 0.0002 | 0.008 |
| Example | Peroxide | Percent | | |
| Control I | | 0 | 1.5 | 2.5 |
| 1 | DCP[2] | 0.25 | 2 | 3.5 |
| 2 | DCP[2] | 0.5 | 4 | 8.5 |
| 3 | DCP[2] | 0.75 | 4.5 | 15.5 |
| 4 | DCP[2] | 1.0 | 7 | 34 |
| 5 | DCP[2] | 2 | 5.5 | 20 |
| 6 | DCP[2] | 2.5 | | 12 |
| 7 | DCP[2] | 3 | 2.5 | 7 |
| 8 | t-BPB[3] | 1 | 8 | 22 |
| | | | Ethylene/Vinyl Acetate [4] | |
| | | | Virgin | Oxidized |
| Peroxide mg./gm | | | 0.05 | 2.4 |
| Control II | | 0 | 6.5 | 10 |
| 9 | DCP | 1 | 16 | 34 |

[1] High pressure process ethylene polymer, density 0.92, melt index (ASTM D-1238-57T at 190° C. and 44 p.s.i.) 2.1.
[2] DCP is dicumyl peroxide.
[3] t-BPB is t-butyl perbenzoate.
[4] Copolymer prepared with 1.5% vinyl acetate in reactor feed; melt index 1.2.

EXAMPLE 10.—IMPROVEMENTS IN ADHESION OF OXIDIZED POLYETHYLENE TO SYNTHETIC RESIN SUBSTRATES BY REACTING WITH ORGANIC PEROXIDES

The procedure of Example 1 is followed except that Mylar (trademark of E. I. du Pont de Nemours for polyethylene terephthalate copolymer) and nylon are used as substrates in place of cold rolled steel.

The organic peroxide reacted oxidized polyethylenes are improved over the virgin polyethylenes which have been reacted with organic peroxides and oxidized polyethylenes which have not been reacted with an organic peroxide.

EXAMPLE 11.—EFFECT OF EXTENT OF PRE-OXIDATION

Portions of an ethylene homopolymer having a melt flow of 2.1 and a density of 0.92 were oxidized by milling in air for different lengths of time on a two roll mill at 170° C., and thereafter milled, after fluxing, with 1% dicumyl peroxide and cured for 60 minutes at 150° C. The results on peel strength of different oxidation times are given in Table IV below.

Table IV

OXIDIZED POLYETHYLENE CROSSLINKED WITH PEROXIDE

| Example | Peroxide, mg./gm. resin | Absolute Carbonyl Absorbance, per mil | Peel Strength (lbs./in.) |
|---|---|---|---|
| Control 1 | 0.03 | 0.0002 | ~6 |
| 11A | 0.15 | 0.0005 | ~10 |
| 11B | 1.2 | 0.0016 | 10 |
| 11C | 1.7 | 0.004 | 17 |
| 11D | 2.1 | 0.008 | ~35 |
| 11E | 4.9 | 0.032 | >40 |

EXAMPLE 12.—USE OF VARIOUS ORGANIC PEROXIDES WITH OXIDIZED ETHYLENE POLYMERS

Adhesive properties are imparted to oxidize polyethylenes by reacting with

Cumene hydroperoxide, Example 12
Di-tert-butyl peroxide, Example 13
Dimethyl peroxide, Example 14
Tetrallyl hydroperoxide, Example 15
n-Octyl hydroperoxide, Example 16
Diethyl peroxide, Example 17
t-Butyl hydroperoxide, Example 18
t-Butyl peracetate, Example 19
Peracetic acid, Example 20
Dibenzoyl peroxide, Example 21
Bis(p-chlorobenzoyl)peroxide, Example 22
Cyclohexanone peroxide, Example 23
Diacetyl peroxide, Example 24
Hydroxyheptyl peroxide, Example 25
Dibutyryl peroxide, Example 26
Dipropionyl peroxide, Example 27
Dioctanoyl peroxide, Example 28
Dilauroyl peroxide, Example 29
Diisopropyl peroxydicarbonate, Example 30
Bis(heptafluorobutyryl)peroxide, Example 31
Bis(2,4-dichlorobenzoyl)peroxide, Example 32
p-Menthane hydroperoxide, Example 33
Pinene hydroperoxide, Example 34
Di-t-butyl diperphthalate, Example 35
t-Butyl peroxyisobutyrate, Example 36
Methyl ethyl ketone peroxide, Example 37
2,5-dimethylhexane-2,5-dihydroperoxide, Example 38

In each example, 1% of the organic peroxide is milled ten end passes at 110° C. on a two roll mill with the oxidized polyethylene (melt index 1.2, density 0.945, a carbonyl absorbance per mil of >0.0005 and a peroxide content of >1.5 mg./gm.).

A 20 mil thick section is stripped off the mill and compression molded at 500 p.s.i. and 110° C. for 5 minutes. The sheet is then placed between two layers of stainless steel (35 mil type 302) and the assembly was placed in a press at 170° C. and 500 p.s.i. for 5 minutes. Adhesion is qualitatively tested immediately and after immersing the test specimens for 6 hours in boiling water. In testing the panels are attempted to be delaminated by hand. In separable laminates are rated excellent; separable laminates are rated fair to poor or poor depending on the ease of delamination. Results are as follows. A control, the same treatment of the same polyethylene without any organic peroxide is also given in Table V.

Table V

| Example | Bond Strength | |
|---|---|---|
| | Immediately | After 6 Hours/ 212° F. H₂O |
| Control I | Fair–Poor | Poor. |
| 12 | Excellent | Excellent. |
| 13 | do | Do. |
| 14 | do | Do. |
| 15 | do | Do. |
| 16 | do | Do. |
| 17 | do | Do. |
| 18 | do | Do. |
| 19 | do | Do. |
| 20 | do | Do. |
| 21 | do | Do. |
| 22 | do | Do. |
| 23 | do | Do. |
| 24 | do | Do. |
| 25 | do | Do. |
| 26 | do | Do. |
| 27 | do | Do. |
| 28 | do | Do. |
| 29 | do | Do. |
| 30 | do | Do. |
| 31 | do | Do. |
| 32 | do | Do. |
| 33 | do | Do. |
| 34 | do | Do. |
| 35 | do | Do. |
| 36 | do | Do. |
| 37 | do | Do. |
| 38 | do | Do. |

EXAMPLES 39–48.—ADHESION OF ORGANIC PEROXIDE MODIFIED POLYETHYLENE TO VARIOUS SUBSTRATES

The olefin polymer adhesive used is polyethylene milled with 1% by weight dicumyl peroxide in the manner of Example 28. Laminates are prepared as in Example 28. All laminates formed are nondelaminatable by hand pressure.

Example 39—35 mil stainless steel/polyethylene/35 mil stainless steel
Example 40—10 mil copper/polyethylene/10 mil copper
Example 41—3 mil aluminum/polyethylene/3 mil aluminum
Example 42—40 mil GRS rubber/polyethylene/40 mil GRS rubber
Example 43—40 mil birch veneer plywood/polyethylene/40 mil birch veneer plywood
Example 44—3 mil aluminum/10 mil polyethylene/40 mil birch veneer plywood
Example 45—cotton cloth/polyethylene/cotton cloth
Example 46—20 mil polyethylene ¹/polyethylene/polyethylene
Example 47—20 mil vinyl chloride-vinyl acetate copolymer/polyethylene/vinyl chloride-vinyl acetate copolymer
Example 48—Portland cement block/polyethylene/Portland cement block

EXAMPLES 49–67

A number of olefin polymer organic peroxide compositions are prepared as in Example 28 and milled to a 10 mil thickness. These sheets are then used to bond 20 mil virgin high density polyethylene (density 0.945, melt index 1.2) to stainless steel (35 mil type 302). The laminates are prepared by placing the adhesive olefin polymer sheet between the polyethylene sheet and the steel panel and compression mold heating the assembly for 10 minutes at 170° C. and 500 p.s.i. pressure.

Testing of adhesion was on a Scott tensile tester. Adhesion greater than 40 p.s.i. is not measured since polyethylene fails at this pressure. Results and experimental data are summarized in the following table.

---
¹ Density 0.916, melt index 20.

Table VI

| Example | Organic Peroxide | Percent | Steel-Polyethylene Laminate/Interlayer | Peel Strength lbs./in., (ASTM D-903) |
|---|---|---|---|---|
| Control I | | 0 | Polyethylene | <1 |
| 49 | DCP [1] | 0.25 | do | 1-2 |
| 50 | DCP | 0.5 | do | 12 |
| 51 | DCP | 0.75 | do | 19 |
| 52 | DCP | 1.0 | do | 35 |
| 53 | DCP | 2.0 | do | >40 |
| 54 | DCP | 2.5 | do | >40 |
| 55 | t-BPB [2] | 0.5 | do | 28 |
| 56 | t-BPB | 1.0 | do | >40 |
| 57 | DEP [3] | 1.0 | do | >40 |
| 58 | DLP [4] | 1.0 | do | >40 |
| 59 | CHP [5] | 1.0 | do | >40 |
| Control II | | 0 | Ethylene/11% Propylene Copolymer, 1.2 Melt Index. | <1 |
| 60 | t-BPB | 0.5 | | 21 |
| 61 | t-BPB | 2.0 | | >40 |
| Control III | | 0 | Ethylene/Vinyl Acetate Copolymer, 2.2 Melt Index, 1.5 Mole percent vinyl acetate in Feed. | 2-3 |
| 62 | t-BPB | 0.5 | | 38 |
| 63 | t-BPB | 2.0 | | >40 |
| Control IV | | 0 | Ethylene/30% Vinyl Acetate Copolymer. | 5 |
| 64 | t-BPB | 1.0 | | 21 |
| 65 | t-BPB | 2.0 | | >40 |
| Control V | | 0 | High Density Polyethylene. (1.6 Melt Index, 0.964 Density.) | <1 |
| 66 | t-BPB | 1.0 | | 29 |
| Control VI | | 0 | Polypropylene (2.6 Melt Index 0.902 Density). | <1 |
| 67 | t-BPB | 1.0 | | 13 |

[1] Dicumyl peroxide.
[2] t-Butyl perbenzoate.
[3] Diethyl peroxide.
[4] Dilauroyl peroxide.
[5] Cumen hydroperoxide.

What is claimed is:
1. An adhesive comprising an oxidized alpha mono-olefinically unsaturated hydrocarbon polymer having a peroxide content of from about 0.15 to about 3.4 milligrams per gram resin crosslinked by heating with from about 0.5 to about 5 percent by weight of an organic peroxide.

2. Method for modifying alpha mono-olefinically unsaturated hydrocarbon polymer to impart improved adhesional characteristics thereto which comprises blending to substantial homogenity an oxidized alpha mono-olefinically unsaturated hydrocarbon polymer having a peroxide content of from about 0.15 to about 3.5 milligrams per gram resin and from about 0.5 to about 5 percent by weight of an organic peroxide, and heating to effect a crosslinking of said polymer with said organic peroxide.

References Cited by the Examiner
UNITED STATES PATENTS

| | | | |
|---|---|---|---|
| 2,628,214 | 2/1952 | Pinkney et al. | 260—94.9 |
| 2,911,398 | 11/1959 | Vandenberg | 260—94.9 |
| 3,012,020 | 12/1961 | Kirk et al. | 260—94.9 |
| 3,020,174 | 2/1962 | Natta et al. | 260—94.9 |
| 3,079,370 | 2/1963 | Precopio et al. | 260—94.9 |

FOREIGN PATENTS 1,076,940  3/1960  Germany.

JOSEPH L. SCHOFER, *Primary Examiner*.

UNITED STATES PATENT OFFICE
CERTIFICATE OF CORRECTION

Patent No. 3,234,197                        February 8, 1966

Bernard O. Baum

It is hereby certified that error appears in the above numbered patent requiring correction and that the said Letters Patent should read as corrected below.

Column 9, line 32, for "3.4" read -- 3.5 --.

Signed and sealed this 24th day of January 1967.

(SEAL)
Attest:

ERNEST W. SWIDER                      EDWARD J. BRENNE
Attesting Officer                       Commissioner of Patent